(12) United States Patent
Prokofiev

(10) Patent No.: US 10,979,283 B2
(45) Date of Patent: Apr. 13, 2021

(54) DISTRIBUTED TRACE OF NETWORK PROCEDURES FOR NETWORK ELEMENTS IN CLOUD DEPLOYMENT

(71) Applicant: NOKIA SOLUTIONS AND NETWORKS OY, Espoo (FI)

(72) Inventor: Vasily Prokofiev, Espoo (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 939 days.

(21) Appl. No.: 15/520,967

(22) PCT Filed: Oct. 23, 2014

(86) PCT No.: PCT/EP2014/072774
§ 371 (c)(1),
(2) Date: Apr. 21, 2017

(87) PCT Pub. No.: WO2016/062346
PCT Pub. Date: Apr. 28, 2016

(65) Prior Publication Data
US 2017/0346675 A1    Nov. 30, 2017

(51) Int. Cl.
*H04L 12/24*    (2006.01)
*H04W 24/08*    (2009.01)
(Continued)

(52) U.S. Cl.
CPC ...... *H04L 41/0631* (2013.01); *H04L 41/0816* (2013.01); *H04W 24/04* (2013.01); *H04W 24/08* (2013.01); *H04W 24/10* (2013.01)

(58) Field of Classification Search
CPC .......... H04L 41/0631; H04L 41/0816; H04W 24/10; H04W 24/04; H04W 24/08
See application file for complete search history.

(56) References Cited

U.S. PATENT DOCUMENTS

| 2002/0063269 A1 | 5/2002 | DiBene |
| 2010/0165862 A1* | 7/2010 | Nylander ............... H04L 41/12 370/252 |

(Continued)

FOREIGN PATENT DOCUMENTS

| CN | 101611599 A | 12/2009 |
| EP | 2 439 977 A2 | 4/2012 |

(Continued)

OTHER PUBLICATIONS

Jul. 23, 2019 Office Action issued in Chinese Patent Application No. 201480084333.5.

(Continued)

*Primary Examiner* — Jamal Javaid
(74) *Attorney, Agent, or Firm* — Squire Patton Boggs (US) LLP

(57) ABSTRACT

The present invention provides apparatuses, methods, computer programs, computer program products and computer-readable media regarding a distributed trace of network procedures for network elements in cloud deployment. The present invention comprises collecting, at a collecting entity, trace information elements for a plurality of network procedures from a plurality of network elements in a network, the trace information element including a trace sequence identifier and an index, the trace sequence identifier identifying a specific network procedure and the index identifying a particular event within the network procedure, in subsequent order for each network procedure based on the trace sequence identifier and the index, and restoring a flow of a network procedure based on the collected and arranged trace information elements for the network procedure.

8 Claims, 13 Drawing Sheets

(51) Int. Cl.
*H04W 24/04* (2009.01)
*H04W 24/10* (2009.01)

(56) References Cited

U.S. PATENT DOCUMENTS

| | | | |
|---|---|---|---|
| 2013/0246776 A1* | 9/2013 | Farrell | G06F 9/3005 |
| | | | 712/227 |
| 2013/0250779 A1* | 9/2013 | Meloche | H04L 41/5067 |
| | | | 370/248 |
| 2015/0067377 A1* | 3/2015 | Park | G06F 1/3212 |
| | | | 713/340 |

FOREIGN PATENT DOCUMENTS

| | | |
|---|---|---|
| WO | WO 2012/019375 A1 | 2/2012 |
| WO | 2013039984 A1 | 3/2013 |
| WO | WO 2013/139984 A1 | 9/2013 |

OTHER PUBLICATIONS

International Search Report & Written Opinion dated Dec. 15, 2014 corresponding to International Patent Application No. PCT/EP2014/072774.
3GPP TS 32A22 V123.0 (Sep. 2014), Technical Specification, 3rd Generation Partnership Project; Technical Specification Group Services and System Aspects; Telecommunication management; Subscriber and equipment trace; Trace control and configuration management (Release 12), Sep. 2014.
Chinese Office Action issued in corresponding Chinese Patent Application No. 201480084333.5 dated Apr. 29, 2020.

* cited by examiner

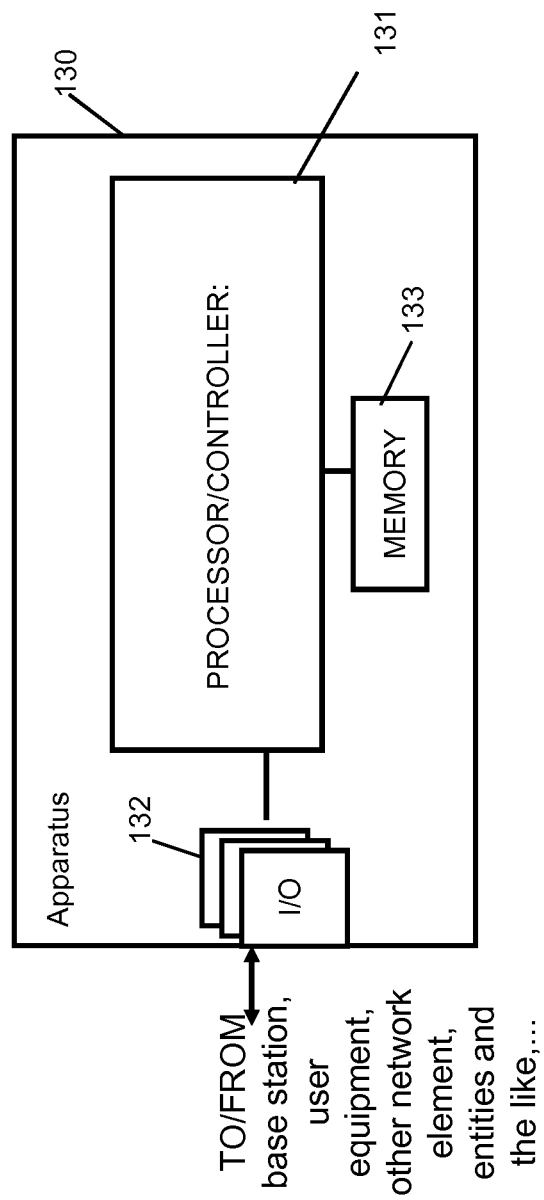

DISTRIBUTED TRACE OF NETWORK PROCEDURES FOR NETWORK ELEMENTS IN CLOUD DEPLOYMENT

FIELD OF THE INVENTION

The present invention relates to apparatuses, methods, systems, computer programs, computer program products and computer-readable media regarding a distributed trace of network procedures for network elements in cloud deployment.

BACKGROUND OF THE INVENTION

Tracing of any complex system becomes a hard task because of the volume of the generated tracing data. Currently known solutions—implementing a trace level and logging levels—do not solve the root cause of the problem, but rather provide a palliative approach. Most of the time, the system has a low level of tracing/logging (production mode), so the system switches into a "deep tracing mode" in case of critical issues. However, this has caused situations in which, when initial signs of problems arise in the system, it would not be properly logged (because of a low level of tracing) and then, when the system enters into the "deep level of tracing", problematic events may not arise. Another side effect is that productivity of the "system under deep logging" is significantly lower than that of a normal one.

With distributed systems, the situation becomes even worse and complicated. The communication channels between systems components impact tracing activity very much, and thus, synchronization of the tracing data and logs becomes a hard task.

Another issue is the problem of transferring tracing data from the system into a so-called Tracing Collection Entity (TCE) (e.g. network management system (NMS)) which actually performs analysis of the collected data.

Table 1 below gives an overview of the trade-off between tracing level and efficiency/impact of some evaluated parameters.

TABLE 1

| Tracing Level | Evaluated Parameter | Impact |
|---|---|---|
| High Level: Deep Level of Tracing e.g. messages, procedures content and results | Performance of NE | In case of depth level of tracing, the Performance of NE degraded dramatically. Usually, NE will be out of production service while deep trace activated on it |
| | The Volume of collected data | Very high volume of data generated |
| | The Load of communication channels | Generated high load to communication channels between NE and Tracing Collection Entity |
| | Stability of Network Element | Stability may be impacted since deep tracing may impact response timing for some of procedures performed on NE |
| | Integrity of provided tracing info. | Integrity and completeness of provided information is enough to make reliable Root-Cause analysis |
| Low Level: Low level of Tracing e.g. critical failures only | Performance of NE | In case of low level of tracing, the Performance of NE keeps on acceptable level |

TABLE 1-continued

| Tracing Level | Evaluated Parameter | Impact |
|---|---|---|
| | The Volume of collected data | Reasonable volume of data generated |
| | The Load of communication channels | Generated reasonable load to communication channels between NE and Tracing Collection Entity |
| | Stability of Network Element | Stability would not be impacted |
| | Integrity of provided tracing info. | Integrity and completeness of provided information is NOT enough to make reliable Root-Cause analysis |

FIG. 1 shows the problem in the case of a standalone network element (NE). In the standard procedure for tracing of a standalone network element as illustrated in FIG. 1, internal logs and data are collected directly from the network element (via a command line interface, as raw data file from local hard drive etc). Here, it is not possible to identify the network procedure (and thus there cannot be made any Root-Cause Analysis), since there are only partial raw data, which need to be synchronized with other partial data from other network elements involved in the network procedure execution, to get relevant input for Root-Cause Analysis. Thus, this method is used for manual Root-Cause analysis and cannot be automated.

FIG. 2 illustrates the case of an evolved packet system (EPS). In FIG. 2, the standard procedure for tracing of a complex system, as specified in 3GPP TS (Technical Specification) 32.422, is shown. The key difference here is to define Tracing Procedure (Trace Recoding Session) which solves the problem of collecting initial data from Network Elements. In context of Tracing Procedure, initial data is identified, collected, re-ordered and prepared for Root-Cause Analysis.

The main disadvantage of the method is its low capacity and scalability. Thus, only a few Tracing Procedures may be initiated simultaneously. The principal disadvantage of the method is that Tracing Procedure must be initiated in advance of a possible problem. In other words, if the problem was recognized in final steps of the Network Procedure execution, there is no theoretical possibility to gather pre-history of earlier stages of procedure execution. The only option is to initiate Tracing Procedure and then repeat Network Procedure again to collect relevant data for Root-Cause Analysis. Thus, this method has very limited capability for Root-Cause Analysis automation.

FIG. 3 illustrates the case of an EPS in Cloud Deployment. The main difference here is that if the Network Procedure is executed across a few clouds, also the Network Elements itself may be deploy as functional blocks in clouds. For example, the mobility management entity (MME) may be decomposed and deployed to a few computation units in the cloud, which has no common hard drive (thus traditional logging into files becomes very problematic there from performance point of view).

The main issue which preventing efficient tracing in Cloud Deployment is that Network Procedure may be executed in few components of the cloud, thus all of those cloud's components shall have equivalent level of tracing depth. In other case, important part of tracing information will be lost because some of component use Low Level Tracing (enabling traditional High Level Tracing is not possible over the whole Network as explained above). In other words, the operator cannot predict "which" Network Procedure will fail and "where" it will fail in the cloud. Further, after Network Procedure failed (thus location of the failure became known at this moment), it is not possible to regain High Level Tracing information, if the cloud element was in the Low Level Tracing mode—thus an important part of the tracing data is lost forever for the particular Network Procedure.

Another problem is how to efficiently identify Network Procedure across a few clouds and many Network Elements deployed into it. As shown in the above case of the EPS, the standard Tracing Procedure (as defined in 3GPP TS 32.422) is not efficient enough to track information from a mass of Tracing Procedures, thus it cannot be efficiently scaled to cloud(s) deployment.

Currently, a "Subscriber and Equipment Trace" feature is specified in document 3GPP TS 32.422. This tracing method is oriented to trace subscribers (by subscriber identity IMSI (International Mobile Subscriber Identity) or IMEI (International Mobile Equipment Identity) or MSISDN (Mobile Subscriber (ISDN (Integrated Services Digital Network) Number)) or predefined Network Elements (eNB (evolved NodeB), MME (Mobility Management Entity), SGW (Serving Gateway) and PGW (Packet Network Data Gateway)).

According to this document, the trace functionality may be management based and signaling based.

In case of management based trace functionality, an operator specifies the user ID type/value (e.g. IMSI) and the Network Element (e.g. PGW). Then, all user's details (like e.g., APN (Access Point Name), RAT (Radio Access Technology), QoS (Quality of Service)) are send to the Trace Collection Entity by the PGW.

In case of signaling based trace functionality, this is enabled at HSS (Home Subscriber Server) for particular UE. In case of an UE attach, the HSS enables tracing in the Update Location Answer message and then MME propagates the Create Session Request to SGW and PGW. While being propagated, the NE starts reporting UE tracing details to the Trace Collection Entity.

As set out above, tracing is concerned as a specific Network Procedure in document 3GPP TS 32.422. That is the reason why tracing has limited capacity (practically, just few subscribers can be traced at once) and needs to be implemented in advanced. The main purpose of the tracing procedure here is network performance optimization and root-cause analysis based on subscriber's requests. Such a feature as described in this document is not intended for a so-called "built-in, always ON, over the whole Network" solution.

Providing operational security and subscriber's privacy are other important points where the existing tracing methods have obvious issues. As mentioned above, existing tracing methods use one of subscriber identity (IMSI or IMEI or MSISDN). This way of combining tracing data affects subscriber privacy and may be prohibited by legislations of some countries. The main requirement is to not put subscriber's identity in a readable format into logs during day-to-day operations, or collect it in any other way other than by authority's approved decision (like court decision). That is the main reason why methods which use subscriber's identity (IMSI or IMEI or MSISDN) for data collection are weak in terms of data protection and keeping subscriber's privacy.

Another practical way for Root-Cause analysis is to manually collect logs (more-or-less formalized) from Network elements, collect raw data about error-codes and counters from Network Element (like via Traffica, NetAct), collect data from Network Interfaces (via Network Analyser Tools, "Network's Sniffers") and then to perform reverse engineering to restore the original Network Procedure flow. However, such an approach is not intended for "built-in, always ON, over the whole Network" solution either.

SUMMARY OF THE INVENTION

It is therefore an object of the present invention to overcome the above mentioned problems and to provide apparatuses, methods, systems, computer programs, computer program products and computer-readable media regarding a distributed trace of network procedures for network elements in cloud deployment.

According to an aspect of the present invention there is provided a method comprising:
 collecting, at a collecting entity, trace information elements for a plurality of network procedures from a plurality of network elements in a network, the trace information element including a trace sequence identifier and an index, the trace sequence identifier identifying a specific network procedure and the index identifying a particular event within the network procedure,
 arranging the collected trace information elements in subsequent order for each network procedure based on the trace sequence identifier and the index, and
 restoring a flow of a network procedure based on the collected and arranged trace information elements for the network procedure.

According to another aspect of the present invention there is provided a method comprising:
 assigning, by a network element, a trace sequence identifier to a specific network procedure in a communication system, and
 assigning, by the network element, an index to a particular event within the specific network procedure,
 the trace sequence identifier being unique for each network procedure in the communication system and being created upon start of the network procedure.

According to another aspect of the present invention there is provided an apparatus for use in a collecting entity comprising:
 at least one processor, and
 at least one memory for storing instructions to be executed by the processor, wherein
 the at least one memory and the instructions are configured to, with the at least one processor, cause the apparatus at least to perform:
 collecting, at a collecting entity, trace information elements for a plurality of network procedures from a plurality of network elements in a network, the trace information element including a trace sequence identifier and an index, the trace sequence identifier identifying a specific network procedure and the index identifying a particular event within the network procedure,
 arranging the collected trace information elements in subsequent order for each network procedure based on the trace sequence identifier and the index, and
 restoring a flow of a network procedure based on the collected and arranged trace information elements for the network procedure.

According to another aspect of the present invention there is provided an apparatus for use in a network element comprising:
 at least one processor, and at least one memory for storing instructions to be executed by the processor, wherein the at least one memory and the instructions are configured to, with the at least one processor, cause the apparatus at least to perform:

assigning, by a network element, a trace sequence identifier to a specific network procedure in a communication system, and assigning, by the network element, an index to a particular event within the specific network procedure, the trace sequence identifier being unique for each network procedure in the communication system and being created upon start of the network procedure.

According to another aspect of the present invention there is provided an apparatus comprising:

means for collecting, at a collecting entity, trace information elements for a plurality of network procedures from a plurality of network elements in a network, the trace information element including a trace sequence identifier and an index, the trace sequence identifier identifying a specific network procedure and the index identifying a particular event within the network procedure, means for arranging the collected trace information elements in subsequent order for each network procedure based on the trace sequence identifier and the index, and means for restoring a flow of a network procedure based on the collected and arranged trace information elements for the network procedure.

According to another aspect of the present invention there is provided an apparatus comprising:

means for assigning, by a network element, a trace sequence identifier to a specific network procedure in a communication system, and means for assigning, by the network element, an index to a particular event within the specific network procedure, the trace sequence identifier being unique for each network procedure in the communication system and being created upon start of the network procedure.

According to another aspect of the present invention there is provided a computer program product comprising code means adapted to produce steps of any of the methods as described above when loaded into the memory of a computer.

According to a still further aspect of the invention there is provided a computer program product as defined above, wherein the computer program product comprises a computer-readable medium on which the software code portions are stored.

According to a still further aspect of the invention there is provided a computer program product as defined above, wherein the program is directly loadable into an internal memory of the processing device.

BRIEF DESCRIPTION OF THE DRAWINGS

These and other objects, features, details and advantages will become more fully apparent from the following detailed description of aspects/embodiments of the present invention which is to be taken in conjunction with the appended drawings, in which:

FIG. 13 is block diagram illustrating an example of an apparatus according to example versions of the present invention.

DETAILED DESCRIPTION

Figure 1:
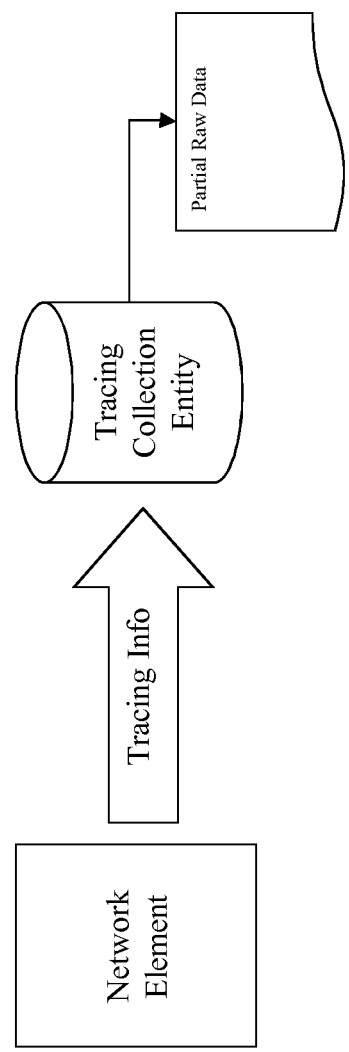
FIG. 1 is a diagram illustrating an example of tracing of a standalone network element.
Figure 2:
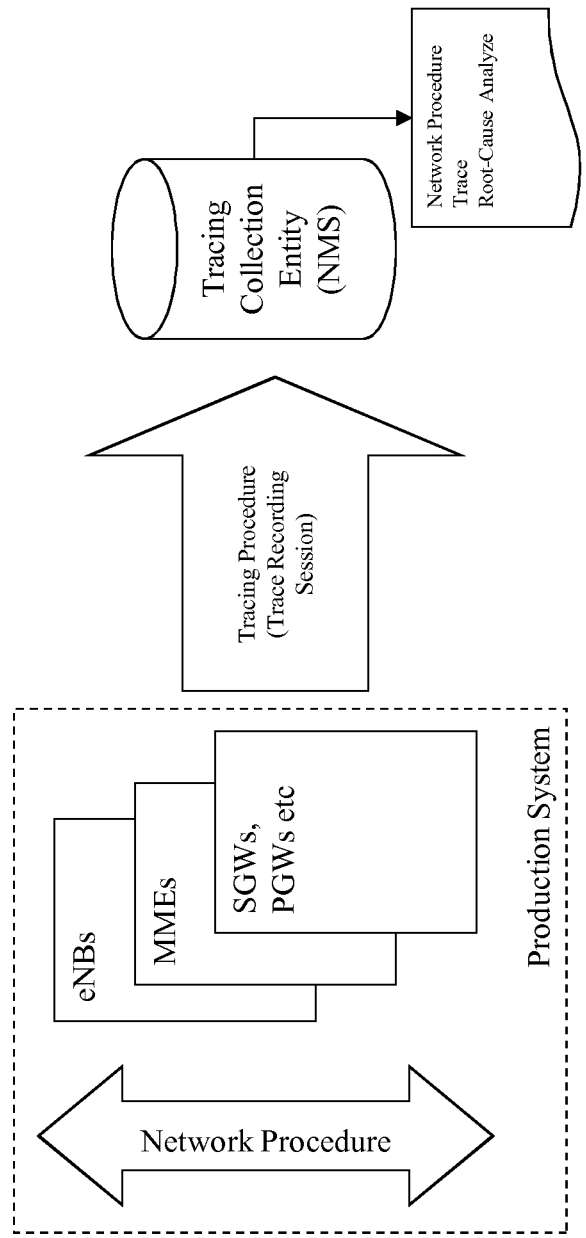
FIG. 2 is a diagram illustrating an example of tracing of a complex system in the case of an evolved packet system.
Figure 3:
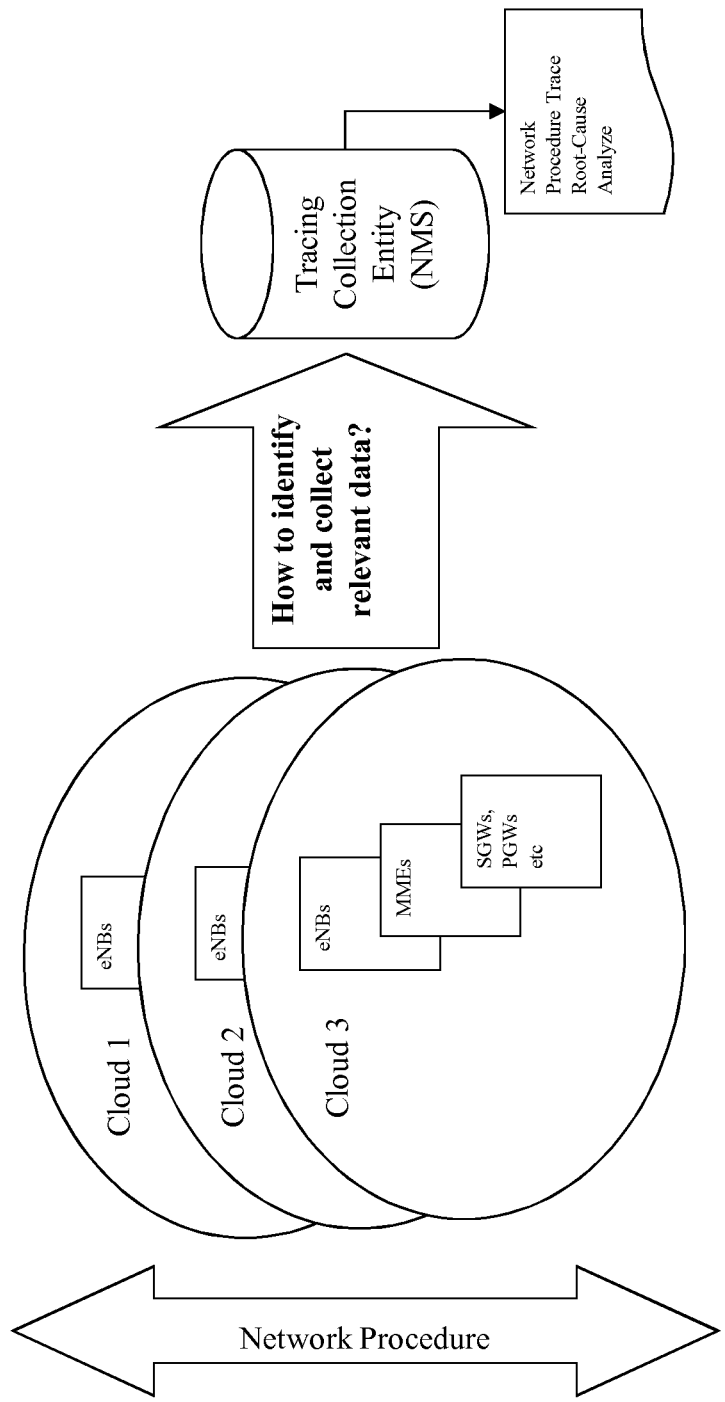
FIG. 3 is a diagram illustrating an example of tracing of a complex system in cloud deployment.

In the following, some example versions of the disclosure and embodiments of the present invention are described with reference to the drawings. For illustrating the present invention, the examples and embodiments will be described in connection with a cellular communication network based on a 3GPP based communication system, for example an LTE/LTE-A based system. However, it is to be noted that the present invention is not limited to an application using such types of communication systems or communication networks, but is also applicable in other types of communication systems or communication networks and the like.

The following examples versions and embodiments are to be understood only as illustrative examples. Although the specification may refer to "an", "one", or "some" example version(s) or embodiment(s) in several locations, this does not necessarily mean that each such reference is to the same example version(s) or embodiment(s), or that the feature only applies to a single example version or embodiment. Single features of different embodiments may also be combined to provide other embodiments. Furthermore, words "comprising" and "including" should be understood as not limiting the described embodiments to consist of only those features that have been mentioned and such example versions and embodiments may also contain also features, structures, units, modules etc. that have not been specifically mentioned.

The basic system architecture of a communication network where examples of embodiments of the invention are applicable may comprise a commonly known architecture of one or more communication systems comprising a wired or wireless access network subsystem and a core network. Such an architecture may comprise one or more communication network control elements, access network elements, radio access network elements, access service network gateways or base transceiver stations, such as a base station (BS), an access point or an eNB, which control a respective coverage area or cell and with which one or more communication elements or terminal devices such as a UE or another device having a similar function, such as a modem chipset, a chip, a module etc., which can also be part of a UE or attached as a separate element to a UE, or the like, are capable to communicate via one or more channels for transmitting several types of data. Furthermore, core network elements such as gateway network elements, policy and charging control network elements, mobility management entities, operation and maintenance elements, and the like may be comprised.

The general functions and interconnections of the described elements, which also depend on the actual network type, are known to those skilled in the art and described in corresponding specifications, so that a detailed description thereof is omitted herein. However, it is to be noted that several additional network elements and signaling links may be employed for a communication to or from a communication element or terminal device like a UE and a communication network control element like a radio network controller, besides those described in detail herein below.

The communication network is also able to communicate with other networks, such as a public switched telephone network or the Internet. The communication network may also be able to support the usage of cloud services. It should be appreciated that BSs and/or eNBs or their functionalities may be implemented by using any node, host, server or access node etc. entity suitable for such a usage.

Furthermore, the described network elements and communication devices, such as terminal devices or user devices like UEs, communication network control elements of a cell, like a BS or an eNB, access network elements like APs and the like, as well as corresponding functions as described herein may be implemented by software, e.g. by a computer program product for a computer, and/or by hardware. In any case, for executing their respective functions, correspondingly used devices, nodes or network elements may comprise several means, modules, units, components, etc. (not shown) which are required for control, processing and/or communication/signaling functionality. Such means, modules, units and components may comprise, for example, one or more processors or processor units including one or more processing portions for executing instructions and/or programs and/or for processing data, storage or memory units or means for storing instructions, programs and/or data, for serving as a work area of the processor or processing portion and the like (e.g. ROM, RAM, EEPROM, and the like), input or interface means for inputting data and instructions by software (e.g. floppy disc, CD-ROM, EEPROM, and the like), a user interface for providing monitor and manipulation possibilities to a user (e.g. a screen, a keyboard and the like), other interface or means for establishing links and/or connections under the control of the processor unit or portion (e.g. wired and wireless interface means, radio interface means comprising e.g. an antenna unit or the like, means for forming a radio communication part etc.) and the like, wherein respective means forming an interface, such as a radio communication part, can be also located on a remote site (e.g. a radio head or a radio station etc.). It is to be noted that in the present specification processing portions should not be only considered to represent physical portions of one or more processors, but may also be considered as a logical division of the referred processing tasks performed by one or more processors.

According to certain aspects of the present invention, there is proposed a method of identifying, collecting and finally composing trace data of Network Procedures, executed on highly-loaded, distributed Network Elements in cloud deployment.

According to certain aspects of the present invention, there is provided a way to resolve major contradictions of tracing into high-loaded distributed systems:

1. Contradiction between performance overhead and depth of tracing details (Tracing Level);
2. Contradiction between volume of tracing information gathering and capacity of communication channels between distributed components and Tracing Collection Entity (e.g. NMS).
3. Contradiction between stochastic nature of faults location and predefined setup for Level of Tracing, as described above
4. Contradiction between requirement of gathering very detailed information of Network Procedures and requirement of providing Subscriber's privacy and anonymity.

Thus, certain aspects of the present invention aim at providing an efficient method for automatic identification, collection and composition of tracing data, which can be used for Automatic Root Cause Analysis in Network Management System for Cloud Deployment.

Further, certain aspects of the present invention aim at solving the following problems:

Problem of efficient identification of Network Procedure in a Cloud;
Problem of efficient collection of Tracing Data for Network Procedure;
Problem of "backward tracking" when there is a need to restore full Tracing Data from the steps which preceded a point of the Network's Procedure failure.

Tagging of Events

First, according to certain aspects of the present invention, it is proposed to assign a 'unique marker' (also referred to as 'tag' hereinafter) to each event entering a system and incrementing a counter each time when the 'marked' event enters a new entity.

In such a case, every tag is unique across the system so that each Network Procedure may be presented as a collection of tagged events. As a result, the Network procedure gets a unique identification across the network.

In the following, the tagging of events according to certain aspects of the present invention will be described in more detail.

According to certain aspects of the present invention, there is described a method of identification of events generated in a Network Element (or group of NEs) in a Cloud Deployment. The method provides the way to resolve two major questions arising for any event's tracking and root-cause analysis, namely:

what is the relative sequence of the events, e.g. how are the events related to each other from a time-line perspective, which one is prior and which one is a subsequent one;
are events "casually linked" with each other, e.g. do they belong to the same network procedure or are they independent from each other.

Thus, one aim of the invention is to provide an efficient automatic collection method of events which can be used for Automatic Root Cause Analysis in the Network Management System for Cloud Deployment.

Collecting a complete set of raw data (logs, interface's traces, counters and alarms) is very important for prompt case resolving and root-cause analysis.

Those activities include the following steps:

collecting counters and alarms provides by NE (to identify a main scope of the problem);

collecting logs from Network Analyzer, connected to the network, to get initial data from network interfaces;

collecting existing logs and other diagnostic records, generated by program blocks of NE (by using a proprietary log viewer like IDA tool or other frameworks);

if the degree of the details of NE's logs is not enough for analysis (which is the most common case since in production mode NE would not generate any detailed logs), then the NE switches to a more detailed log level when more details are to be provided;

comparing the logs and traces from different sources to filter out relevant events (logs entity, message traces, packet decoding etc.);

reordering events into chronically sequence;

reverse engineering to restore a full picture on how message flow was initiated and what was the input/output of the NE and the network counterparts;

making conclusion about root-cause of the issues and propose recommendation for resolution.

The main problem of the procedure described above is to gather pieces of information across many sources (NEs, network interfaces) and manually filtered relevant blocks and messages (like by using unique subscriber's identification like IMSI, GUTI (Globally Unique Temporary Identifier) etc, comparing the timestamps, comparing message sequence numbers etc). As bottom line, it is noted that this kind of activity is not formalized; it needs big amount of manual work and high qualification of personnel.

Thus, it is intended to provide a fully automatic and formalized sequence of events generated by one or few Network Elements which is ordered by time and casually linked—only this sequence is intended for fully automatic root-cause analysis.

For the purpose of a better understanding of the following description, some definitions of terms are provided that are used in the following. However, it is noted that these definitions are merely intended to facilitate the understanding of the invention and are not intended to limit the respective terms to the definition provided herewith.

Network procedure: A Network Procedure is a limited sequence of operations which is executed consistently by Network Elements (for example, within a cloud environment, without being limited thereto). Such a sequence of operations may be executed in several entities like, but not limited to, UE, eNB, MME, GW, IMS, PCRF, etc). A Network Procedure has initial and final states; it has an initial event which initiated the Network Procedure execution (like, for example, but not limited to, User or Network Activity events, timer expiration event etc). The problem of tracing for Network Procedure is to restore exact sequence and related parameters for each of subsequent operation for each of Network Elements involved in the Network Procedure execution.

Event: The decision point where the NE handles input data and provides output for further processing.

Examples of typical events in the network are mentioned in the following.

(1) handling an incoming message by initiation of new network procedure in the NE (like for example, an Attach procedure initiated by MME in response to an Attach_Request message from a mobile terminal);

(2) handling a request message and providing a response of sending the new message with some cause code (like create request by MME toward HSS about subscriber's credentials); and (3) handling a request message with response of error cause code (like terminating Attach procedure with rejection "no roaming allowed by subscription" by MME).

Sequence of Events: The uniquely ordered sequence of events, which are casually linked with each other.

Examples of the sequence of events in the network are as follows.

from the above mentioned examples of events, the event sequence (1)→(2)→(3) is the sequence of events;

from the above mentioned examples of events, the event sequence (1)→(3)→(2) is not the sequence of events;

from the above mentioned examples of events, the event sequence (1)→(2")→(3), where the event (2") belongs to some other transaction/subscriber, is not the sequence of events.

Thus, certain aspects of the present invention define a procedure how to derive the sequence of events out from Network Procedures executed on one or many Network Elements.

When the event's trace is started, each originated procedure is tagged by a unique index which is created and updated by the following algorithm shown in Table 2.

TABLE 2

| Information Element | Type | Description |
| --- | --- | --- |
| Trace Sequence ID | Hex | Looped Unique Sequence, created when procedures starts |
| Incremental Hop | Hex | Linearly incremented, updated every time when NE performs any action during Network Procedure |

Figure 4:
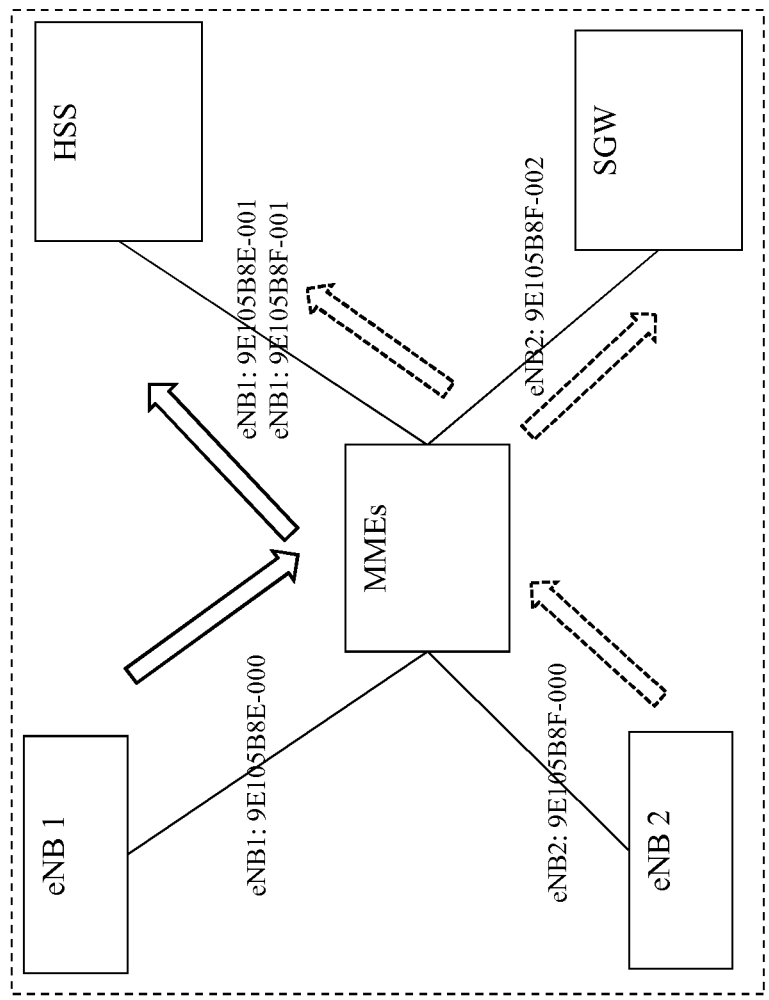
FIG. 4 is a diagram illustrating an example of a distribution of tagged events across a network according to some example versions of the present invention.

In the following, an example of the tag will be explained with reference to FIG. 4. As shown in FIG. 4, one attach procedure, denoted with solid arrows, is started at eNB 1 and terminated after the HSS response, and another attach procedure, denoted with broken-line arrows is started at the eNB 2 and continues towards the SGW after the HSS response.

The eNB 1 received an Attach Request from UE/Subscriber 1 and automatically tagged the event with 9E105B8E-000, where 9E105B8E is a unique Trace Sequence ID, and 000 is the hop inside the sequence.

Further, the eNB 2 received an Attach Request from UE/Subscriber 2 and automatically tagged the event with 9E105B8F-000, where 9E105B8F is a unique Trace Sequence ID, and 000 is the hop inside the sequence.

The unique Trace Sequence ID may be derived based on any algorithm, pre-agreed across the Network System. For example, it can be the sum of MAC (Media Access Control) address (of any network interface of Network Element which started Network Procedure) plus next integer in the looped sequence.

The length of Unique Trace Sequence ID is looped and depends on the volume of event's loop that should be traced. For example, after tracing 1 billion events in the network, the same sequence could be re-entered again.

When Updating the Event's Trace, for each operation executed, the NE updates the "Incremental Hop" part of the tag and preserved the unique Trace Sequence ID.

A first example of the tag before the operation is 9E105B8E-000, where 9E105B8E is a unique Trace Sequence ID, and 000 is the hop inside the sequence.

Then, the MME sends an Update Location Request for Subscriber 1 to the HSS and automatically updates the hop in the tagged event. Then, the HSS returns an error code 'RoamingNotAllowed'.

An example of the tag after the operation is 9E105B8E-001, where 9E105B8E is a unique Trace Sequence ID, and 001 is the next hop inside the sequence.

At this point, it is possible to identify the error condition and to identify all pre-conditions while retrieving all events marked with tag 9E105B8E.

A second example of the tag before operation is 9E105B8F-000, where 9E105B8F is a unique Trace Sequence ID, and 000 is the hop inside the sequence.

Then, the MME sends an Update Location Request for Subscriber 2 to the HSS and automatically updates the hop in the tagged event. Then, the HSS returns a cause code 'Ok'.

An example of the tag after operation is 9E105B8F-001, where 9E105B8F is a unique Trace Sequence ID, and 001 is the next hop inside the sequence.

Next, the Event's Trace is collected across the Network.

To trace any Network Procedure, an algorithm collects the Event's Sequence from all Network Elements with a given Trace Sequence ID and re-orders the events by the Incremental Hop value.

So it is possible to distinct two procedures and to identify the exact Root Cause of failures for one of them, as illustrated in Table 3.

TABLE 3

| Trace Sequence ID | Hop | Root Cause |
| --- | --- | --- |
| 9E105B8E | 000 | eNB/ - - - |
| 9E105B8E | 001 | HSS/Roaming Not Allowed-Network Procedure Terminated |
| 9E105B8F | 000 | eNB'/ - - - |
| 9E105B8F | 001 | HSS/Ok |
| 9E105B8F | 002 | MME/ . . . |
| 9E105B8F | 003 | SGW/ . . . |

It is noted that the Table 3 is only an example and that the Network Procedures typically contain more than two events and more than two Network Elements so that a typical table would be longer and will contain all pre-conditions which are leading to particular failure.

As a next step, a backward trace for failed Network Procedure is performed.

It is noted that according to certain aspects of the present invention, backward tracing is always possible since the feature is "Always-ON over the whole Network" by default.

In a case in which the Network Procedure failed "in the middle" and it is desired to re-engineer the scenario which caused the failure, then the Tag with a proper Unique Trace Sequence ID is filtered out and the hops are re-ordered inside this selection—that immediately presents the restored scenario.

In view of the above, according to certain aspects of the present invention, there is provided a "built-in, always ON, over the whole Network" traceability for complex networks (especially in Cloud Deployment) and well suited for Network Management Automation while implementing a standard and efficient way for events identification and event's tracing.

Thus, in summary, a unique marker is assigned to each event entering a system and a counter is incremented each time when the marked event enters a new entity. Every tag is unique across the system so that each network procedure may be presented as collection of tagged events. Thus, the network procedure gets a unique identification across the network.

Store Trace Information Element for Each Tagged Event

As a next step, the trace information element for each tagged event is stored. While the Network Procedure is executed on the Network Element, the trace of the information (which is relevant for the given Network Procedure) is stored in a local memory, e.g. a trace buffer, of the Network Element.

The "Trace Information Element" is essential trace information, which is specified for a particular phase of the Network Procedure/Tagged Events, like for example, parameters of procedure call, information element(s) of message, result of the processing etc. The "Trace Information Element" is more-or-less equal to the information placed into logs details traditionally. The degree of details of the Trace Information Element is depending of the level of Trace. That is, at the deepest level, it may copy the whole information elements of the original Network Procedure.

Each component of the System handles the "Trace Buffer" for the Network Procedures it has processed.

The Trace Buffer has limited capacity and it organized as queue buffer, thus new events come to the buffer and are disposed one-by-one when the buffer's capacity is exceeded.

Figure 5:
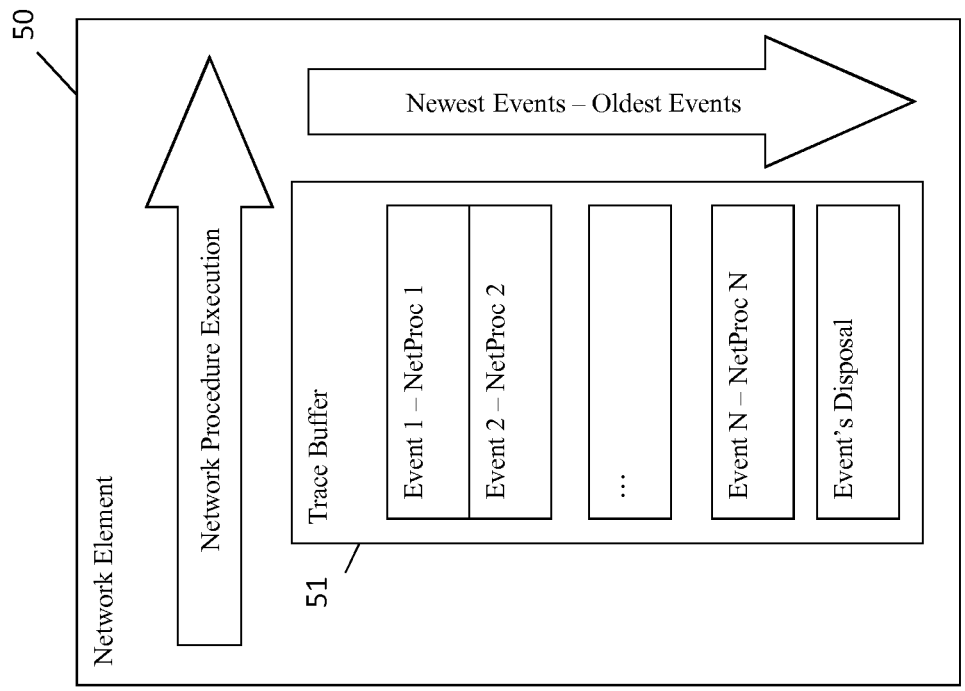
FIG. 5 is diagram illustrating an example of trace information elements stored in a local memory according to some example versions of the present invention.

FIG. 5 is diagram illustrating the storage of trace information elements in a local memory, i.e. trace buffer 51, of the network element 50.

Thus, the network element stores the information elements of the traces of all network procedures that are executed on the respective network element according to the capacity of the trace buffer.

Collect Trace Representation of the Network Procedure Across Network Elements

After executing the Network Procedure on the Network Elements, the setup of Tagged Events and Traced Information Elements follows.

The Tagged Events are selected by filtering them by means of the "Unique Trace Sequence ID (UTSID)" and re-ordered along the "Hop IDs", as described above. In other words, the Network Procedure flow sequence is restored across each of the Network Element over the whole Network.

Figure 6:
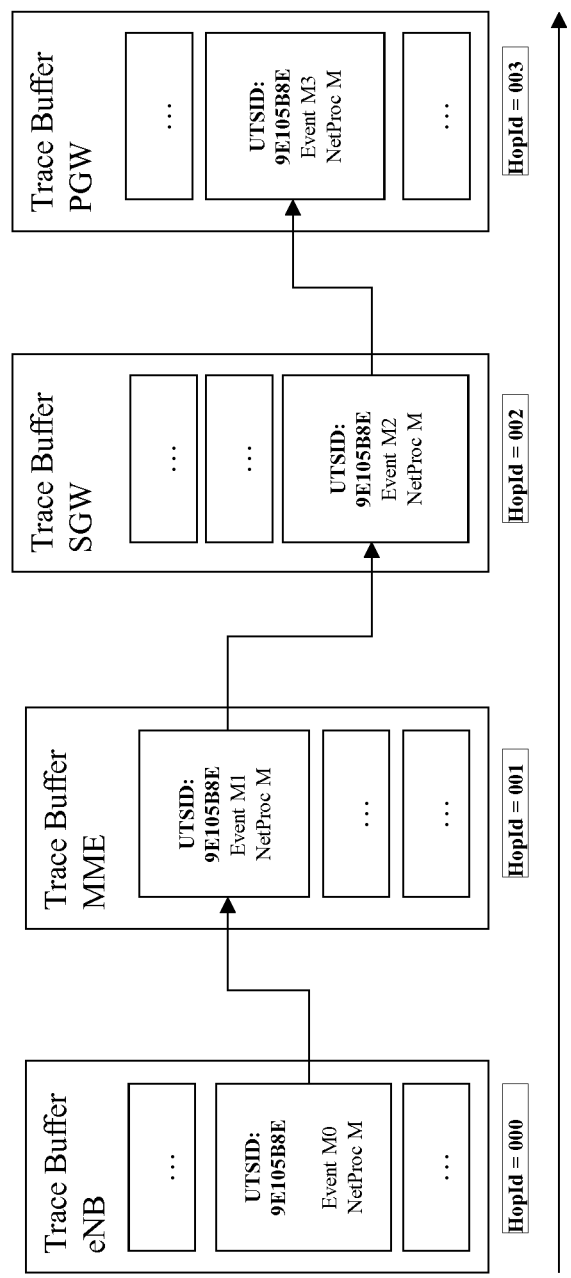
FIG. 6 is a diagram illustrating an example of a collection of trace information elements for a given network procedure across network elements over the whole network according to some example versions of the present invention.

FIG. 6 is a diagram illustrating an example of the collection of trace information elements for a given network procedure across network elements over the whole network.

As a result, the trace information elements for a given network procedure, identified by means of the unique trace sequence ID ("9E10568E" in FIG. 6) is collected in the proper order by means of the Hop IDs ("000" to "003" in FIG. 6) over the whole network.

Backward Restoring of the Flow of the Network Procedure Based on Collected Trace Information Elements In this regard, it is noted that other methods of traces (like specified in 3GPP TS 32.422) do not provide the possibility of backward tracing. Namely, according to the conventional methods, as described above, the Tracing Procedure shall be activated before the potential problem will happen. In the same way, in the traditional tracing procedure, the tracing with the deepest degree of details shall be activated before it is possible to collect any Trace Info concerning the Network Procedure failure. There is no possibility to revert back if it is necessary to react on the failure by collecting detail information "in past".

As soon as Trace Information elements are collected across the whole network, they are properly ordered (in terms of time-line and "casual links").

Depending on the selection, some of the available Tracing Collection Entities is selected for the Backward Restoring procedure. The selected Tracing Collection Entity will pool Network Elements and retrieve relevant data concerning the particular Network Procedure. This guarantees that service is scalable in terms of capacity and may be deployed in line with actual needs.

Figure 7:
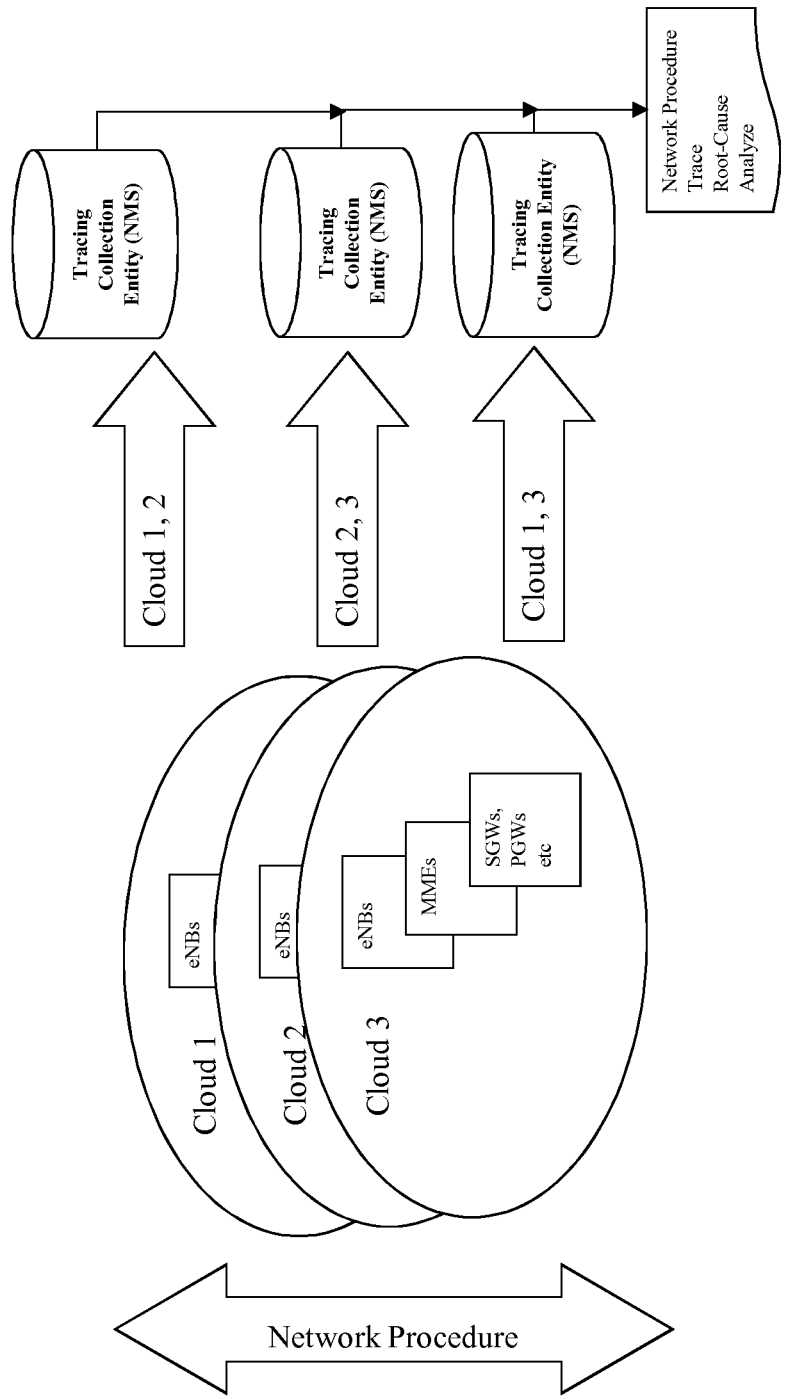
FIG. 7 is a diagram illustrating an example of a dynamic elasticity for backward tracing of network procedures according to some example versions of the present invention.

FIG. 7 is a diagram illustrating the dynamic elasticity for backward tracing of network procedures.

As a result, the trace information (collected with a predefined degree of details) is available for automatic Root-Cause Analysis.

Elasticity of Distributed Trace for Cloud Deployment

The method according to certain aspects of the present invention is featured especially for Cloud Deployment because in the Cloud Deployment, the Network Element functionality may be distribute across separated computation units (computers) which are physically separated from each other. In that deployment, they may not have a common storage device, like a hard disk, which used for traditional logging procedures (like storing and passing logs to NMS by FTP).

Further, in the Cloud Deployment, the number of Network Elements may be quite high such that there is obviously a limitation for loading of single Trace Collection Entity (NMS). Thus, any method for Cloud Deployment shall provide a possibility for scaling up and down, depending on the actual load.

Figure 8:
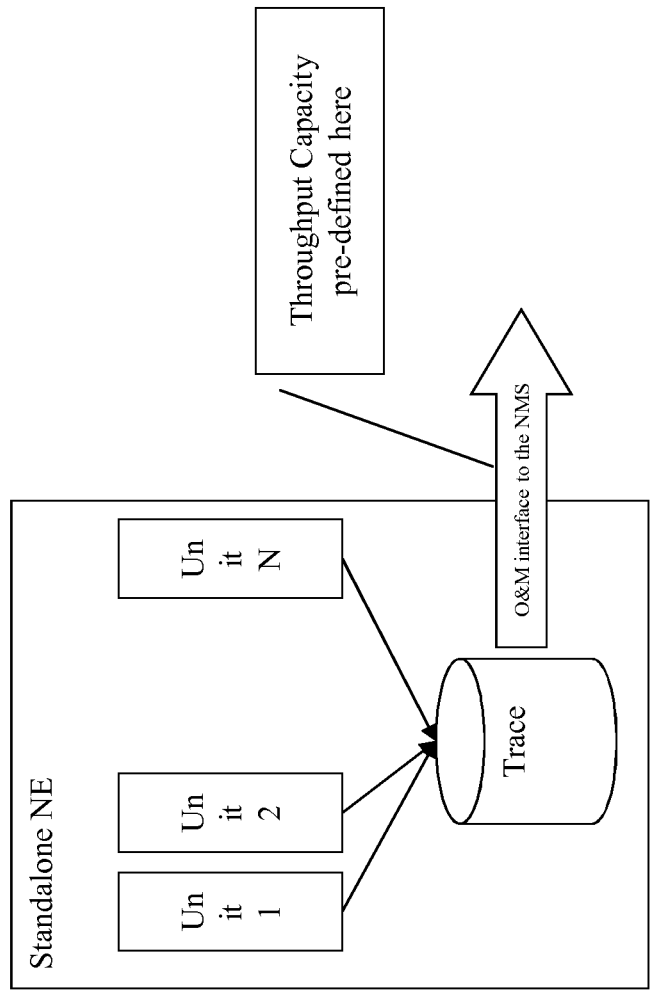
FIG. 8 is a diagram illustrating a typical realization of a trace functionality for a standalone network element according to some example versions of the present invention.

FIG. 8 is a diagram illustrating a typical realization of a trace functionality for a standalone network element. As illustrated in FIG. 8, the throughput capacity of the O&M interface to the NMS is pre-defined.

Figure 9:
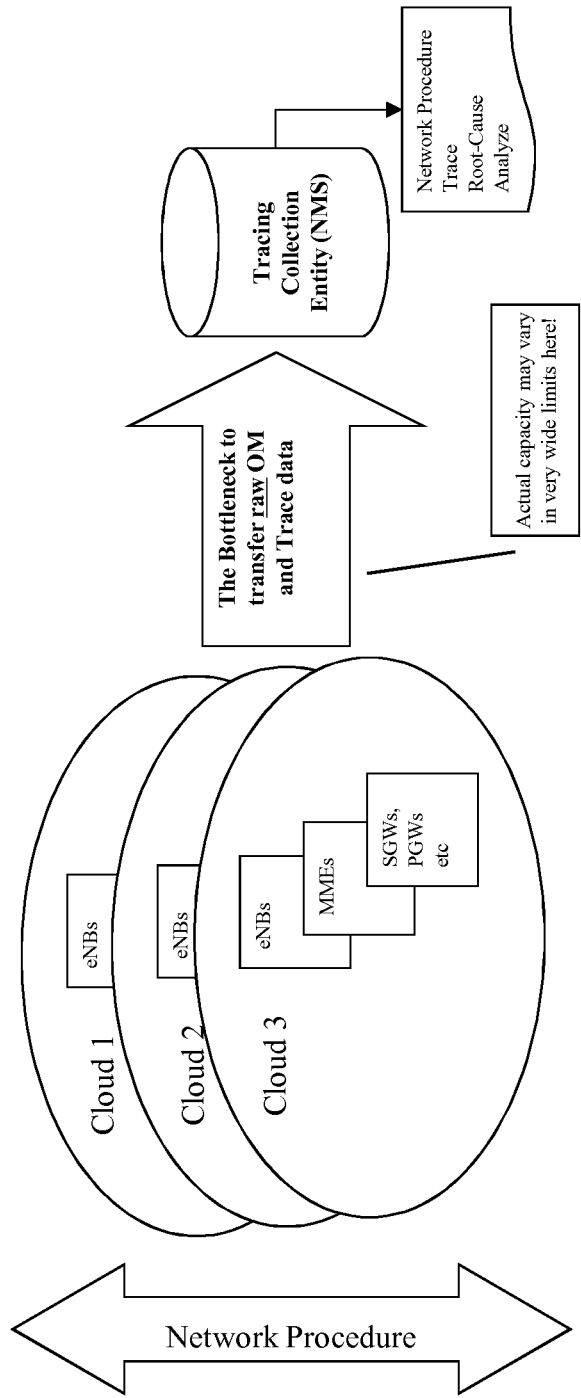
FIG. 9 is a diagram illustrating a possible bottleneck when using a non-scalable tracing method for cloud deployment according to some example versions of the present invention.

FIG. 9 is a diagram illustrating a possible bottleneck when using a non-scalable tracing method for Cloud Deployment. As shown in FIG. 9, the throughput capacity of the interface to the NMS may vary, and thus, may be a bottleneck for transferring raw data.

Despite of existing tracing implementations (Subscriber Tracing, for example), which suppose that a special Network Procedure is initiated which is especially for tracing purposes, the proposed method according to certain aspects of the present invention is designed as a "built-in, always ON, over the whole Network" feature, which is transparent to equipment, subscriber identification, and network configuration.

The implementation of the above described aspects of the present invention may be realized in existing products (like eNB, MME, and/or Gateways) by adding one information element, called e.g. "Event's Tag" to the signaling messages. No other deep re-engineering is needed.

The proposed method of tagging events according to certain aspects of the present invention has the following advantages:

very low capacity overhead (only one tagged label identify transaction and event);

very good scalability because information element of the Tag (hex value) may be sorted very efficiently in contradiction of traditional text search of logs files;

there are theoretical capability to track transaction over 3-rd party systems and networks if they can preserve or ignore Tag information;

Further, the proposed method according to certain aspects of the present invention especially fits with Cloud Based Deployment of Network Elements because:

There are free calculation and memory resources available to process tracing and store results;

Configuration Network Elements in a cloud (distributed and virtualized units) may depart of traditional design when all logs are stored in a centralized way on a permanent storage drive of a Network Element;

There are additional requirements for Network Management Automation and Network troubleshooting due to bigger capacity and complexity of the network.

In case of implementation there is a possibility to track transactions from radio to core network transparently, in real-time mode. Important case of usage of proposed method is Network Management System with Automation capabilities which provide functionality for Root-Cause analysis for network failures.

Table 4 shows a comparison between the current subscriber and equipment trace, as specified in 3GPP TS 432.422 and the "tagged events's trace" according to certain aspects of the present invention.

TABLE 4

| Parameter | "Subscriber and Equipment Trace" Feature specified in 3GPP TS 32.422 | "Tagged Event's Trace" |
|---|---|---|
| Capacity | Low - only limited amount of traces may be initiated simultaneous for few subscribers; | High - potentially traced all events in the network; |
| Scalability | Low - only certain elements are traceable (MME, SGW, HSS, PGW); | High - potentially any network element may be traceable; |
| Compatibility | Low - 3GPP only, if feature supported | High - potentially non-3GPP system may be traced if system can by-pass or ignore information elements with Tags; |
| Backward tracing | No - no possibility to trace events back if feature was not activated | Yes - it is possible to track events back in case if failure occurs, since all Tags stored until they are overwritten. |

In the following there is given a capacity estimation for the method according to certain aspects of the present invention. However, it is noted that this is only an example and that the present invention is of course not limited to such an example.

The limitation is related with the capacity of the "Trace Buffer" located in each of Network Elements.

In the following, there is evaluated the needed capacity for a situation of 3 tracing mode and the "memory consumption vs. capacity" relationship is estimated.

It is assumed that:

a light trace consumes 0.1 KB of trace info per event;

a medium trace consumes 1 KB of trace info per event;
a full trace consumes 5 KB of trace info per event;

The main observation is that the capacity has a linear dependency of the Transaction Rate and Depth of Trace.

For the maximum possible Depth of Trace (when 5 KB are reserved for logging each signaling message/event), there is achieved a throughput of 500 MB/sec for a Network Element running with 100 transactions per second.

So, having 2 GB of memory allocated for the Trace Buffer per Network Element, it is guaranteed to keep 4 seconds of trace (in assumption that most of Network Procedures lasted not more than 500 ms, like typical IMSI Attach takes 100-200 ms into production network).

Figure 10:
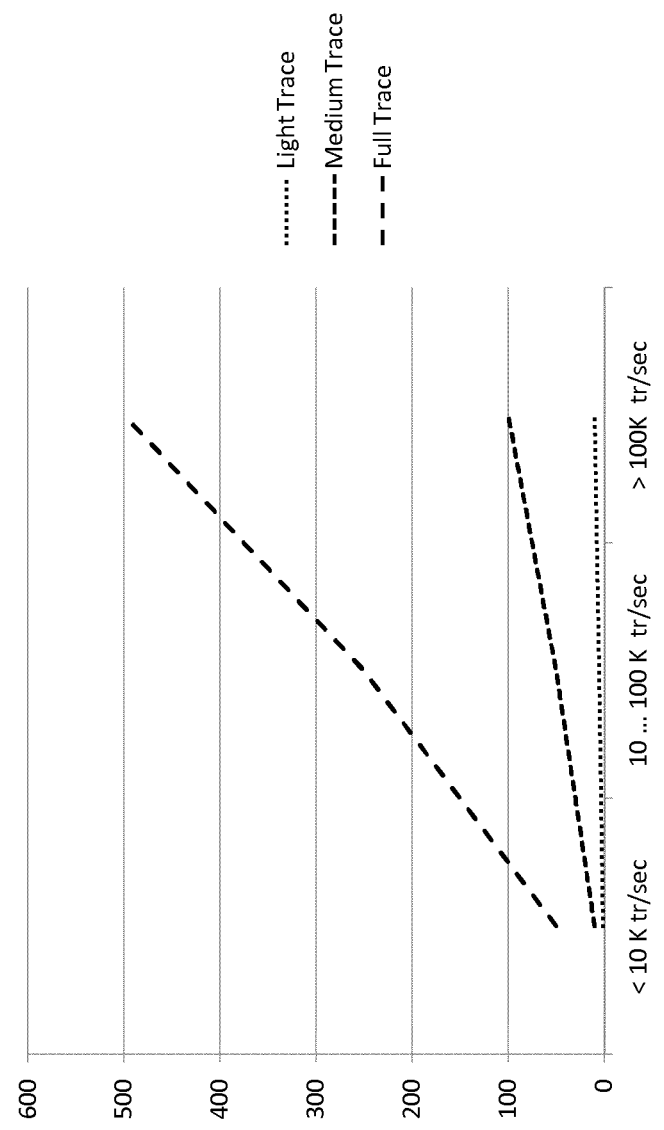
FIG. 10 is a diagram illustrating an example of capacity estimations according to some example versions of the present invention.

FIG. 10 is a diagram illustrating the capacity estimations and shows that for the medium trace and the light trace, 20 sec and 100 sec of trace can be guaranteed, respectively.

In the following, a more general description of certain embodiments of the present invention is made with respect to FIGS. 11 to 13.

Figure 11:
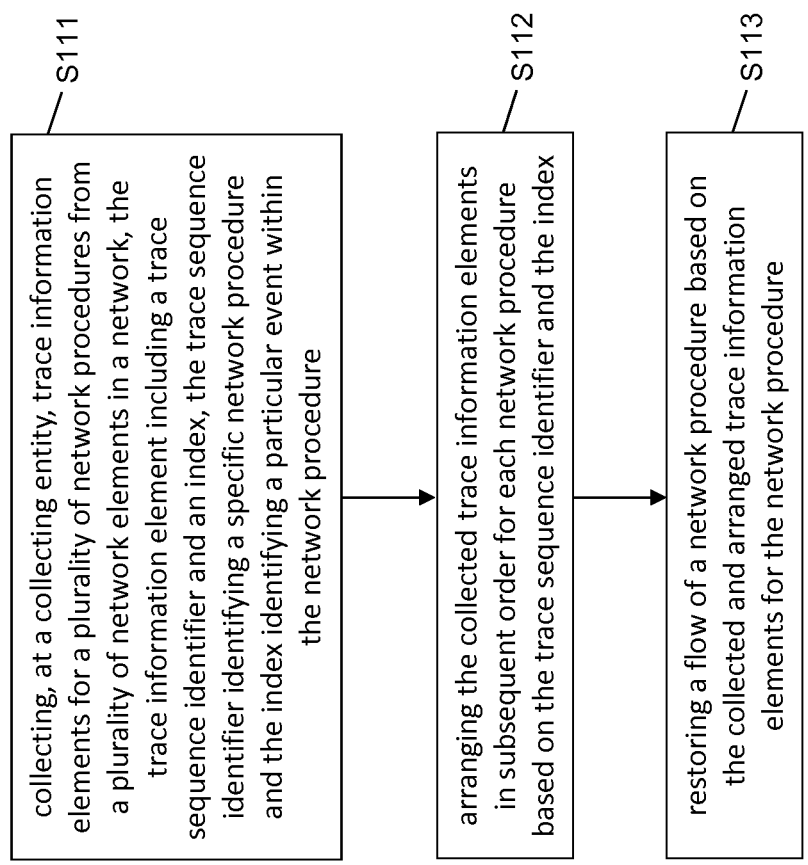
FIG. 11 is a flowchart illustrating an example of a method according to example versions of the present invention.

FIG. 11 is a flowchart illustrating an example of a method according to example versions of the present invention.

According to example versions of the present invention, the method may be implemented in a collecting entity like, for example, a network management entity or the like. The method comprises collecting, at a collecting entity, trace information elements for a plurality of network procedures from a plurality of network elements in a network, the trace information element including a trace sequence identifier and an index, the trace sequence identifier identifying a specific network procedure and the index identifying a particular event within the network procedure in a step S111, and arranging the collected trace information elements in subsequent order for each network procedure based on the trace sequence identifier and the index in a step S112. Further, the method comprises restoring a flow of a network procedure based on the collected and arranged trace information elements for the network procedure in a step S113.

According to example versions of the present invention, the trace sequence identifier is unique for each network procedure and is created upon start of the network procedure.

According to example versions of the present invention, the index is associated with trace sequence identifier of a respective network procedure and is linearly incremented upon occurrence of an event during the respective network procedure.

According to example versions of the present invention, the method is implemented in a cloud based deployment of the network elements.

Figure 12:
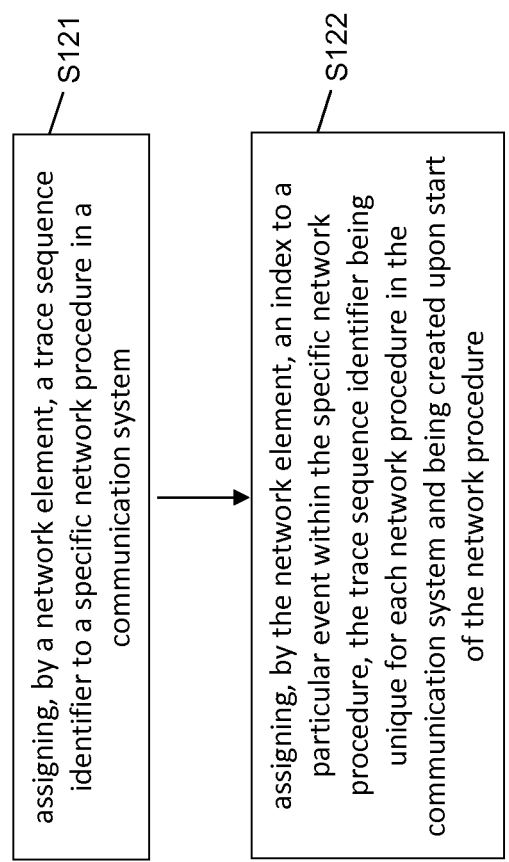
FIG. 12 is a flowchart illustrating an example of another method according to example versions of the present invention.

FIG. 12 is a flowchart illustrating another example of a method according to example versions of the present invention.

According to example versions of the present invention, the method may be implemented in a network element like, for example, a base station, e.g. NB or eNB, a mobility management entity like MME or a gateway like PGW, SGW, or the like. The method comprises assigning, by a network element, a trace sequence identifier to a specific network procedure in a communication system in a step S121, and assigning, by the network element, an index to a particular event within the specific network procedure in a step S122. The trace sequence identifier is unique for each network procedure in the communication system and is created upon start of the procedure.

According to example versions of the present invention, the index is associated with the trace sequence identifier of the respective network procedure and is linearly incremented upon occurrence of the particular event during the respective network procedure.

According to example versions of the present invention, the method is implemented in a cloud based deployment of the network element.

FIG. 13 is a block diagram showing an example of an apparatus according to example versions of the present invention.

In FIG. 13, a block circuit diagram illustrating a configuration of an apparatus 130 is shown, which is configured to implement the above described aspects of the invention. It is to be noted that the apparatus 130 shown in FIG. 13 may comprise several further elements or functions besides those described herein below, which are omitted herein for the sake of simplicity as they are not essential for understanding the invention. Furthermore, the apparatus may be also another device having a similar function, such as a chipset, a chip, a module etc., which can also be part of an apparatus or attached as a separate element to the apparatus, or the like.

The apparatus 130 may comprise a processing function or processor 131, such as a CPU (Central Processing Unit) or the like, which executes instructions given by programs or the like. The processor 131 may comprise one or more processing portions dedicated to specific processing as described below, or the processing may be run in a single processor. Portions for executing such specific processing may be also provided as discrete elements or within one or further processors or processing portions, such as in one physical processor like a CPU or in several physical entities, for example. Reference sign 132 denotes transceiver or input/output (I/O) units (interfaces) connected to the processor 131. The I/O units 132 may be used for communicating with one or more other network elements, entities, terminals or the like. The I/O units 132 may be a combined unit comprising communication equipment towards several network elements, or may comprise a distributed structure with a plurality of different interfaces for different network elements. Reference sign 133 denotes a memory usable, for example, for storing data and programs to be executed by the processor 131 and/or as a working storage of the processor 131.

The processor 131 is configured to execute processing related to the above described aspects. In particular, the apparatus 130 may be implemented in or may be part of a collecting entity like, for example, a network management entity or the like, and may be configured to perform a method as described in connection with FIG. 11. Thus, the processor 131 is configured to perform collecting, at a collecting entity, trace information elements for a plurality of network procedures from a plurality of network elements in a network, the trace information element including a trace sequence identifier and an index, the trace sequence identifier identifying a specific network procedure and the index identifying a particular event within the network procedure, and arranging the collected trace information elements in subsequent order for each network procedure based on the trace sequence identifier and the index, and restoring a flow of a network procedure based on the collected and arranged trace information elements for the network procedure.

According to other example versions of the present invention, the apparatus 130 may be implemented in or may be part of a network element like, for example, a base station, e.g. NB or eNB, a mobility management entity like MME or a gateway like PGW, SGW, or the like, and may be configured to perform a method as described in connection with FIG. 12. Thus, the processor 131 is configured to perform assigning, by a network element, a trace sequence identifier to a specific network procedure in a communication system, and assigning, by the network element, an index to a particular event within the specific network procedure. The trace sequence identifier is unique for each network procedure in the communication system and is created upon start of the network procedure.

For further details regarding the functions of the apparatus 130, reference is made to the description of the method according to example versions of the present invention as described in connection with FIGS. 11 and 12.

Thus, it is noted that the apparatus for use in a collecting entity and the apparatus for use in a network element, generally have the same structural components, wherein these components are configured to execute the respective functions of the collecting entity or network element, respectively, as set out above.

In the foregoing exemplary description of the apparatus, only the units/means that are relevant for understanding the principles of the invention have been described using functional blocks. The apparatus may comprise further units/means that are necessary for its respective operation, respectively. However, a description of these units/means is omitted in this specification. The arrangement of the functional blocks of the apparatus is not construed to limit the invention, and the functions may be performed by one block or further split into sub-blocks.

When in the foregoing description it is stated that the apparatus (or some other means) is configured to perform some function, this is to be construed to be equivalent to a description stating that a (i.e. at least one) processor or corresponding circuitry, potentially in cooperation with computer program code stored in the memory of the respective apparatus, is configured to cause the apparatus to perform at least the thus mentioned function. Also, such function is to be construed to be equivalently implementable by specifically configured circuitry or means for performing the respective function (i.e. the expression "unit configured to" is construed to be equivalent to an expression such as "means for").

For the purpose of the present invention as described herein above, it should be noted that
  method steps likely to be implemented as software code portions and being run using a processor at an apparatus (as examples of devices, apparatuses and/or modules thereof, or as examples of entities including apparatuses and/or modules therefore), are software code independent and can be specified using any known or future developed programming language as long as the functionality defined by the method steps is preserved;
  generally, any method step is suitable to be implemented as software or by hardware without changing the idea of the aspects/embodiments and its modification in terms of the functionality implemented;
  method steps and/or devices, units or means likely to be implemented as hardware components at the above-defined apparatuses, or any module(s) thereof, (e.g., devices carrying out the functions of the apparatuses according to the aspects/embodiments as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Array) components, CPLD (Complex Programmable Logic Device) components or DSP (Digital Signal Processor) components;
  devices, units or means (e.g. the above-defined apparatuses, or any one of their respective units/means) can be implemented as individual devices, units or means, but this does not exclude that they are implemented in a distributed fashion throughout the system, as long as the functionality of the device, unit or means is preserved;
  an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;
  a device may be regarded as an apparatus or as an assembly of more than one apparatus, whether functionally in cooperation with each other or functionally independently of each other but in a same device housing, for example.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Devices and means can be implemented as individual devices, but this does not exclude that they are implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

It is noted that the aspects/embodiments and general and specific examples described above are provided for illustrative purposes only and are in no way intended that the present invention is restricted thereto. Rather, it is the intention that all variations and modifications which fall within the scope of the appended claims are covered.

The invention claimed is:

1. A method, comprising:
  collecting, at a collecting entity, trace information elements for a plurality of network procedures from a plurality of network elements in a network, the trace information element including a trace sequence identifier and an index, the trace sequence identifier identifying a specific network procedure and the index identifying a particular event within the network procedure, arranging the collected trace information elements in subsequent order for each network procedure based on the trace sequence identifier and the index, and restoring a flow of a network procedure based on the collected and arranged trace information elements for the network procedure, wherein the trace sequence identifier is unique for each network procedure and is created upon start of the network procedure.

2. A method, comprising:

collecting, at a collecting entity, trace information elements for a plurality of network procedures from a plurality of network elements in a network, the trace information element including a trace sequence identifier and an index, the trace sequence identifier identifying a specific network procedure and the index identifying a particular event within the network procedure, arranging the collected trace information elements in subsequent order for each network procedure based on the trace sequence identifier and the index, and restoring a flow of a network procedure based on the collected and arranged trace information elements for the network procedure, wherein the index is associated with trace sequence identifier of a respective network procedure and is linearly incremented upon occurrence of an event during the respective network procedure.

3. The method according to claim 1, wherein the method is implemented in a cloud based deployment of the network elements.

4. An apparatus, comprising:

at least one processor, and at least one memory for storing instructions to be executed by the processor, wherein the at least one memory and the instructions are configured to, with the at least one processor, cause the apparatus at least to perform:

collecting trace information elements for a plurality of network procedures from a plurality of network elements in a network, the trace information element including a trace sequence identifier and an index, the trace sequence identifier identifying a specific network procedure and the index identifying a particular event within the network procedure, arranging the collected trace information elements in subsequent order for each network procedure based on the trace sequence identifier and the index, and restoring a flow of a network procedure based on the collected and arranged trace information elements for the network procedure, wherein the trace sequence identifier is unique for each network procedure and is created upon start of the network procedure.

5. An apparatus, comprising:

at least one processor, and at least one memory for storing instructions to be executed by the processor, wherein the at least one memory and the instructions are configured to, with the at least one processor, cause the apparatus at least to perform:

collecting trace information elements for a plurality of network procedures from a plurality of network elements in a network, the trace information element including a trace sequence identifier and an index, the trace sequence identifier identifying a specific network procedure and the index identifying a particular event within the network procedure, arranging the collected trace information elements in subsequent order for each network procedure based on the trace sequence identifier and the index, and restoring a flow of a network procedure based on the collected and arranged trace information elements for the network procedure, wherein the index is associated with trace sequence identifier of a respective network procedure and is linearly incremented upon occurrence of an event during the respective network procedure.

6. The apparatus according to claim 4, wherein the apparatus is implemented in a cloud based deployment of the network elements.

7. A computer program, embodied on a non-transitory computer readable medium, the computer program, when executed by a processing device, causes the processing device to:

collect trace information elements for a plurality of network procedures from a plurality of network elements in a network, the trace information element including a trace sequence identifier and an index, the trace sequence identifier identifying a specific network procedure and the index identifying a particular event within the network procedure;

arrange the collected trace information elements in subsequent order for each network procedure based on the trace sequence identifier and the index; and restore a flow of a network procedure based on the collected and arranged trace information elements for the network procedure, wherein the trace sequence identifier is unique for each network procedure and is created upon start of the network procedure.

8. The computer program according to claim 7, wherein the computer program is directly loadable into an internal memory of the processing device.

\* \* \* \* \*